United States Patent
Shea, Jr. et al.

(10) Patent No.: US 12,531,044 B2
(45) Date of Patent: Jan. 20, 2026

(54) PHASED ARRAY ULTRASONIC TESTING DEVICE

(71) Applicant: The Boeing Company, Chicago, IL (US)

(72) Inventors: Joseph Michael Shea, Jr., Slidell, LA (US); Alex McMullin, Athens, AL (US); Rosemarie Kathleen Sanders, Madison, AL (US); Gregory Allen Crum, Slidell, LA (US); Kevin Alan Maurigi, Jr., Bay St. Louis, MS (US); Maurice Kyle Smith, Picayune, MS (US)

(73) Assignee: THE BOEING COMPANY, Arlington, VA (US)

( * ) Notice: Subject to any disclaimer, the term of this patent is extended or adjusted under 35 U.S.C. 154(b) by 559 days.

(21) Appl. No.: 17/520,014

(22) Filed: Nov. 5, 2021

(65) Prior Publication Data
US 2024/0071349 A1 Feb. 29, 2024

Related U.S. Application Data

(60) Provisional application No. 63/140,520, filed on Jan. 22, 2021.

(51) Int. Cl.
| | | |
|---|---|---|
| *G10K 11/00* | (2006.01) | |
| *G01N 29/07* | (2006.01) | |
| *G01N 29/26* | (2006.01) | |
| *G01N 29/265* | (2006.01) | |

(52) U.S. Cl.
CPC ......... *G10K 11/004* (2013.01); *G01N 29/075* (2013.01); *G01N 29/262* (2013.01); *G01N 29/265* (2013.01); *G01N 2291/106* (2013.01)

(58) Field of Classification Search
CPC .. G10K 11/004; G01N 29/075; G01N 29/262; G01N 29/265; G01N 2291/106
See application file for complete search history.

(56) References Cited

U.S. PATENT DOCUMENTS

| | | | |
|---|---|---|---|
| 11,035,829 B2* | 6/2021 | Wells | G01N 29/2487 |
| 2011/0277549 A1* | 11/2011 | Frederick | G01N 29/262 |
| | | | 73/627 |
| 2013/0218490 A1* | 8/2013 | Poirier | G01N 29/265 |
| | | | 702/56 |
| 2017/0059531 A1* | 3/2017 | Fetzer | B64F 5/60 |

* cited by examiner

*Primary Examiner* — Isam A Alsomiri
*Assistant Examiner* — Abdallah Abulaban
(74) *Attorney, Agent, or Firm* — COATS & BENNETT, PLLC

(57) ABSTRACT

A phased array ultrasonic testing device for positioning first and second phased array probes relative to a surface of a material to be tested. The testing device includes a first wedge configured to receive and orient the first phased array probe relative to the surface. A second wedge is configured to receive and orient the second phased array probe relative to the surface. A coupling structure is mounted to the first and second wedges and configured to selectively provide for the first and second wedges to move parallel to one another in a first direction and restrict relative movement of the first and second wedges in other directions.

20 Claims, 10 Drawing Sheets

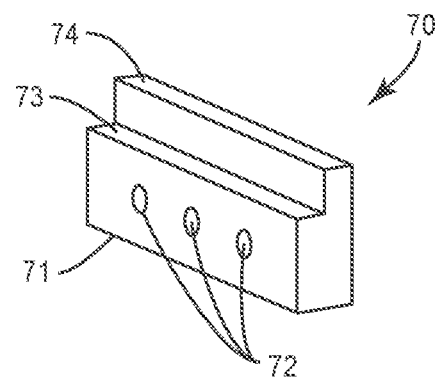
FIG. 6
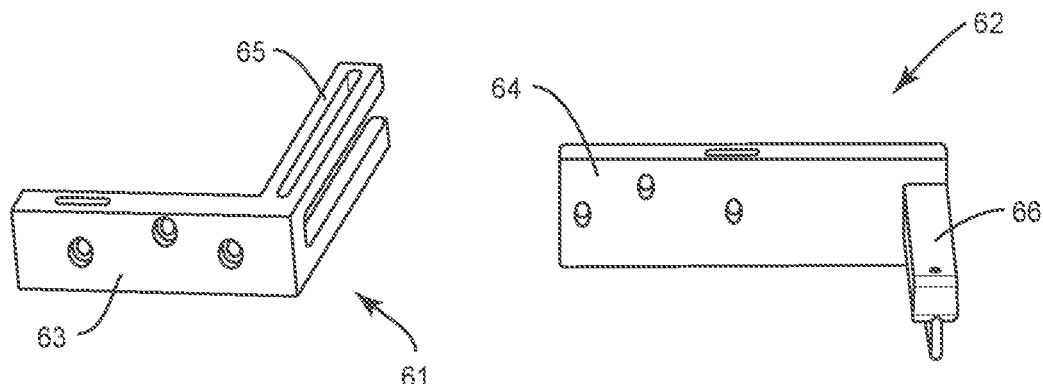
FIG. 7
FIG. 8
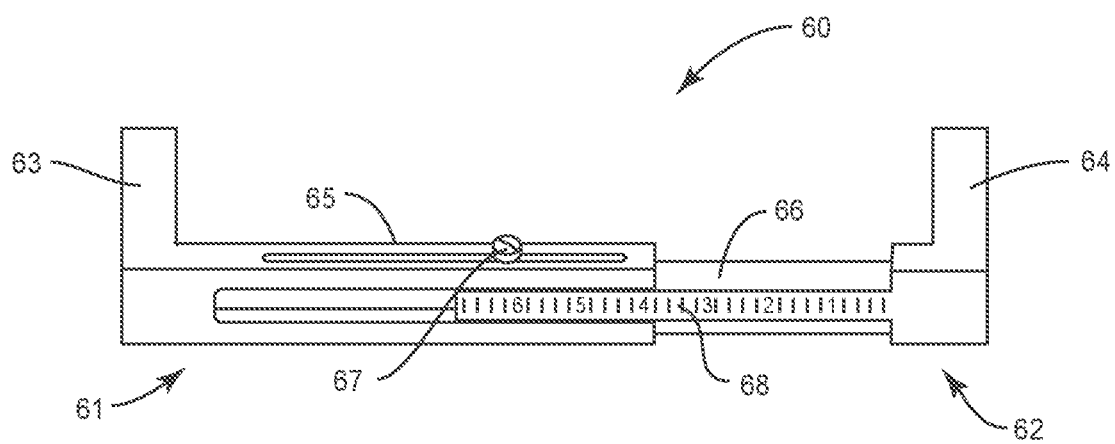
FIG. 9

PHASED ARRAY ULTRASONIC TESTING DEVICE

RELATED APPLICATIONS

This application claims priority from U.S. Provisional App. No. 63/140,520, filed 22 Jan. 2021, the disclosure of which is incorporated by reference herein in its entirety.

GOVERNMENT LICENSE RIGHTS

This invention was made with Government support under contract number NNM07AB03C awarded by NASA. The government has certain rights in this invention.

TECHNOLOGICAL FIELD

The present disclosure relates generally to the field of testing devices and, more specifically, to testing devices configured to position multiple probes and provide for their placement relative to a tested material.

BACKGROUND

Phased array ultrasonic testing (PAUT) systems provide for nondestructive testing of a wide array of materials. The PAUT systems can be used in various contexts, such as but not limited to detecting flaws in manufactured materials such as welds that connect multiple material pieces. One specific application is testing friction stir welds. The PAUT system generally includes a single probe that is mounted to a holding device. During testing, the probe/holder assembly is moved along the length of the test material. In many applications, the probe/holder assembly is mounted to a robotic device that moves the assembly along the material during the testing.

Many testing methods require data obtained from probes that are aligned at multiple different angles relative to the surface of the material. This can require the probe/holder assembly to be passed multiple times over the material with each pass having the probe set at a different angle. The total number of passes along the material depends upon the amount of information necessary to complete the testing. The need for multiple passes increases the overall testing time, particularly when large areas are being tested. Further, the testing requires changing the probe angle prior to each pass to obtain the necessary information.

Present testing methods use multiple probe/holder assemblies that can each be aligned at a different angle relative to the material. The assemblies are attached to a robotic device and moved together as a unit along the material. The total number of passes by the robotic device along the material is decreased depending upon the number of assemblies that can be attached to the robotic device and the amount of different angular information that is necessary for the testing.

A drawback of attaching multiple separate probe/holder assemblies to the robotic device is the increased overall size of the testing apparatus. For example, the different probe/holder assemblies can be positioned in a side-by-side arrangement on the robotic device. This increases the overall footprint which may prevent or hinder the ability to performing testing in relatively small spaces or over complex geometries such as compounding curves. For example, when the testing location is in a relatively small area such as within the interior of a holding tank, the robotic device with the multiple assemblies may not be able to be inserted into the area or otherwise moved along the material. Further, the size may be increased as each separate probe/holder assembly may require one or more utility lines for operation, such as vacuum lines, fluid lines, and electrical power lines. Further, the robotic device may not be equipped to accommodate the weight of the multiple probe/holder assemblies and the utility lines.

Further, each separate probe/holder assembly requires a setup time to mount to the robotic device, attach the supporting components, set the desired angular position and index offset, and ensure proper operation. The use of a relatively large number of probe/holder assemblies can greatly increase the overall setup time needed to perform the testing.

SUMMARY

One aspect is directed to a phased array ultrasonic testing device for positioning first and second phased array probes relative to a surface of a material to be tested. The testing device comprises a first wedge configured to receive and orient the first phased array probe relative to the surface. A second wedge is configured to receive and orient the second phased array probe relative to the surface. A coupling structure is mounted to the first and second wedges and configured to selectively provide for the first and second wedges to move parallel to one another in a first direction and restrict relative movement of the first and second wedges in other directions.

In another aspect, the coupling structure maintains bottom sides of the first and second wedges aligned within a plane during the parallel movement.

In another aspect, the coupling structure comprises a first section mounted to the first wedge and a second section mounted to the second wedge with each of the first and second sections comprising extensions that mate together in an overlapping arrangement.

In another aspect, the coupling structure extends along a lateral side of just one of the first and second wedges and is positioned away from the lateral side of the other one of the first and second wedges.

In another aspect, the first section is mounted in a slot in a front side of the first wedge and is flush with the front side and the second section is mounted in a slot in a front side of the second wedge and is flush with the front side.

In another aspect, the first and second wedges comprise inner lateral sides and the coupling structure is configured to maintain the inner lateral sides abutted together.

In another aspect, a slot is positioned in the inner lateral side of the first wedge and the coupling structure further comprises a slide that extends laterally outward beyond the inner lateral side of the second wedge with the slide positioned in the slot.

In another aspect, the slide is constructed from a different material than the first and second wedges and is attached to the inner lateral side of the second wedge.

In another aspect, the coupling structure is configured to lock the first and second wedges in a selected configuration relative to each other, and the coupling structure and the first and second wedges are adapted to be moved along the surface while locked in the selected configuration.

One aspect is directed to a phased array ultrasonic testing device for positioning first and second phased array probes to test a material. The testing device comprises a first wedge comprising a bottom side, inner and outer lateral sides, and a mounting position configured to receive the first phased array probe. A second wedge comprises a bottom side, inner and outer lateral sides, and a mounting position configured to receive the second phased array probe. A coupling structure aligns the first and second wedges together with the inner lateral sides positioned together and the bottom sides aligned in a plane and with the coupling structure configured to provide for relative parallel movement between the first and second wedges with the bottom sides remaining aligned within the plane.

In another aspect, the coupling structure comprises a first section mounted to the first wedge and a second section mounted to the second wedge with the first and second sections engaged in intermeshing arrangement to be movable relative to each other to provide for the relative parallel movement between the first and second wedges with the bottom sides remaining aligned within the plane.

In another aspect, the coupling structure further comprises a single locking member attached to the first and second sections with the locking member movable between a locked position to prevent relative movement between the first and second sections and an unlocked position to allow relative movement between the first and second sections.

In another aspect, the first section is embedded within a front side of the first wedge and the second section is embedded within a front side of the second wedge.

In another aspect, the coupling structure further comprises arms that extend over top sides of the first and second wedges.

In another aspect, a slot is positioned in the inner lateral side of the first wedge and a slide extends outward from the inner lateral side of the second wedge with the slide positioned in the slot.

One aspect is directed to a method of non-destructive testing a material using first and second phased array probes. The method comprises supporting the first and second phased array probes in a testing device having first and second wedges configured to respectively maintain the phased array probes in corresponding orientations relative to a surface of the material upon which the testing device is placed. The method comprises locking a coupling structure which couples the first and second wedges to selectively allow relative movement thereof in a first direction while restricting relative movement in other directions, with the first and second wedges in a selected configuration relative to each other. The method comprises moving the testing device along the surface with the first and second wedges locked in the selected configuration by the coupling structure.

In another aspect, the method comprises adjusting the coupling structure and moving the first and second wedges to the selected configuration.

In another aspect, the method comprises intermeshing a first arm attached to the first wedge and a second arm attached to the second wedge while adjusting the coupling structure and overlapping the first and second arms.

In another aspect, the method comprises securing a locking member that is attached to the first and second arms and preventing relative movement between the first and second wedges.

In another aspect, the method comprises scanning the material with the first and second phased array probes while the testing device is in the selected configuration.

The features, functions and advantages that have been discussed can be achieved independently in various aspects or may be combined in yet other aspects, further details of which can be seen with reference to the following description and the drawings.

BRIEF DESCRIPTION OF THE DRAWINGS

FIG. 6 is a perspective view of a slide configured to be attached to one of the first and second wedges.

FIG. 7 is a perspective view of a first section of a coupling structure.

FIG. 8 is a perspective view of a second section of a coupling structure.

FIG. 9 is a perspective view of first and second sections of a coupling structure that are intermeshed together.

DETAILED DESCRIPTION

Figure 1:
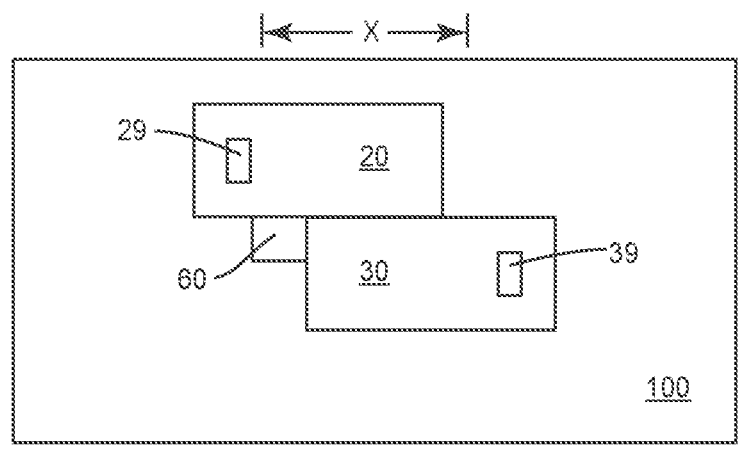
FIG. 1 is schematic diagram of a testing device.

FIG. 1 schematically illustrates a testing device 10 that includes first and second wedges 20, 30. The first wedge 20 includes a first mounting position 29 and the second wedge 30 includes a second mounting position 39. A coupling structure 60 is mounted to the first and second wedges 20, 30. The coupling structure 60 is configured for the first and second wedges 20, 30 to move parallel to one another along the material 100 in a first direction as illustrated by arrow A. A distance X measured between mounting positions 29, 39 can be adjusted to accommodate the testing. The coupling structure 60 is further configured to restrict movement of the first and second wedges 20, 30 in other directions.

The testing device 10 is configured for ultrasonic non-destructive testing a variety of different materials 100. The testing can be used to detect discontinuities in the material 100, such as those caused by cracks or flaws in the material and/or joints that join two or more sections of the material 100. Testing can also be used to detect a thickness of the material and for corrosion testing. In one example, the testing is performed to inspect welds in the material 100, such as friction stir welds. In one specific application, the testing device 10 is used for cryogenic tank examinations in aircraft, particularly space vehicles. In one example, the material 100 is relatively flat to accommodate the movement of the testing device 10 across the surface.

The testing device 10 provides for the simultaneous use of multiple phased array probes 40, 50. The testing device 10 is configured to support the phased array probes 40, 50 at multiple different angular and indexing positions. The design also increases the number of separate phased array probes 40, 50 that can be attached to a robotic device, as well as to reduce the overall size and weight of the testing equipment that is attached to a robotic device. The testing device 10 also reduces the setup time over existing testing devices and methods. In one example, the setup time is reduced by one half.

Figure 2:
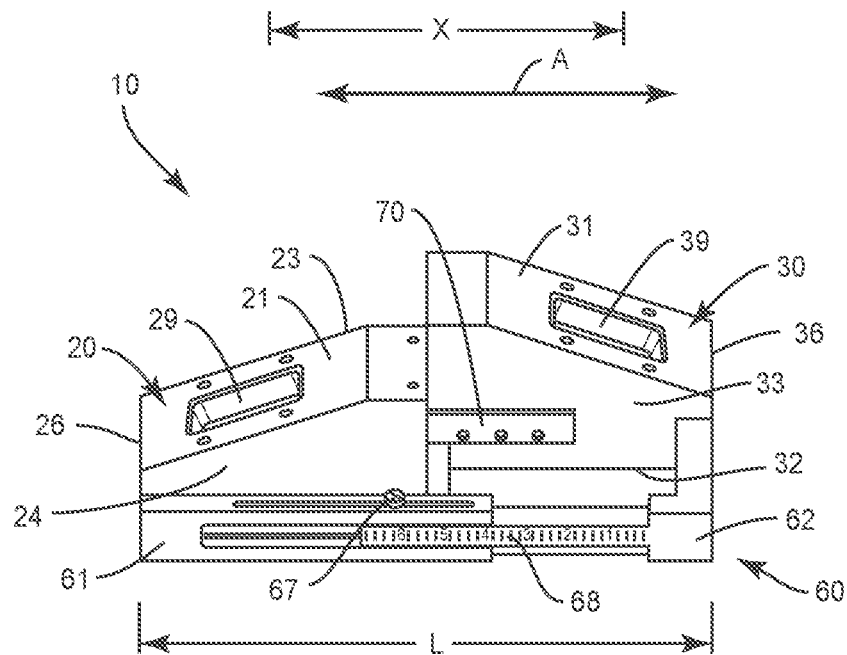
FIG. 2 is a side perspective view of a testing device.
Figure 3:
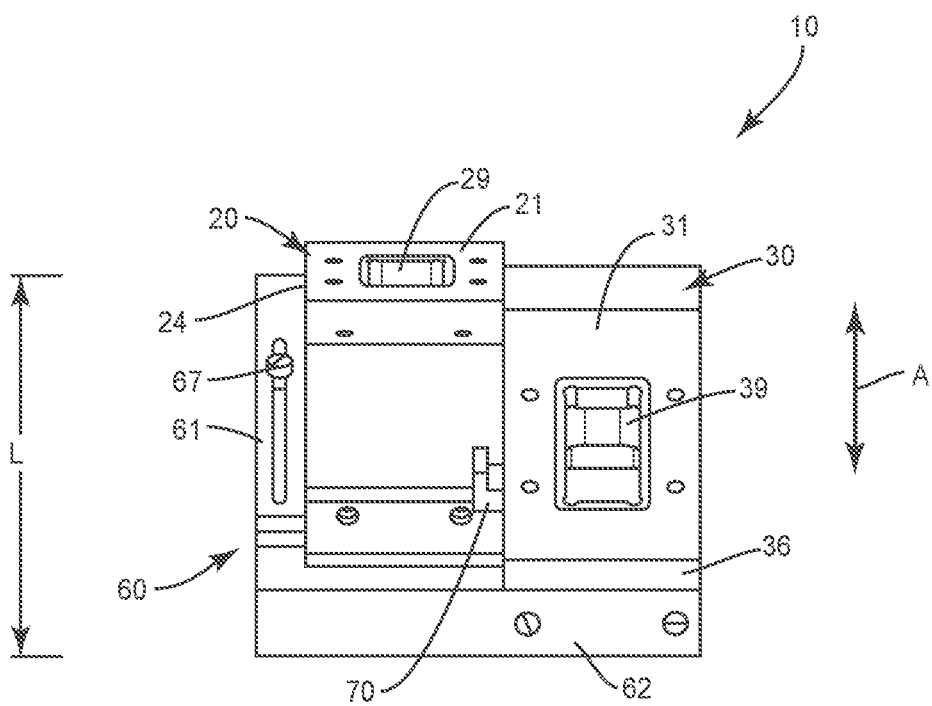
FIG. 3 is an end perspective view of the testing device of FIG. 2.

FIGS. 2 and 3 illustrate a testing device 10 that includes a first wedge 20, a second wedge 30, and a coupling structure 60. The coupling structure 60 mounts the first wedge 20 to the second wedge 30 and provides for relative movement between the first and second wedges 20, 30 parallel to one another in the direction illustrated by arrow A. This movement can include back-and-forth relative movement of the wedges 20, 30 in a first plane. The parallel movement provides for adjusting a distance X measured between the mounting positions 29, 39 that are configured to receive phased array probes 40, 50. The movement also adjusts an overall length L of the device 10. The coupling structure 60 further prevents movement of the first and second wedges 20, 30 in other directions that are outside of the first plane.

Figure 4A:
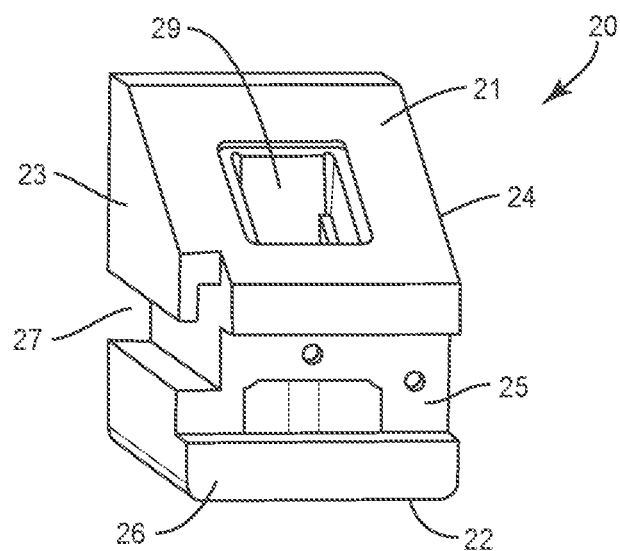
FIG. 4A is a front perspective view of a first wedge.
Figure 4B:
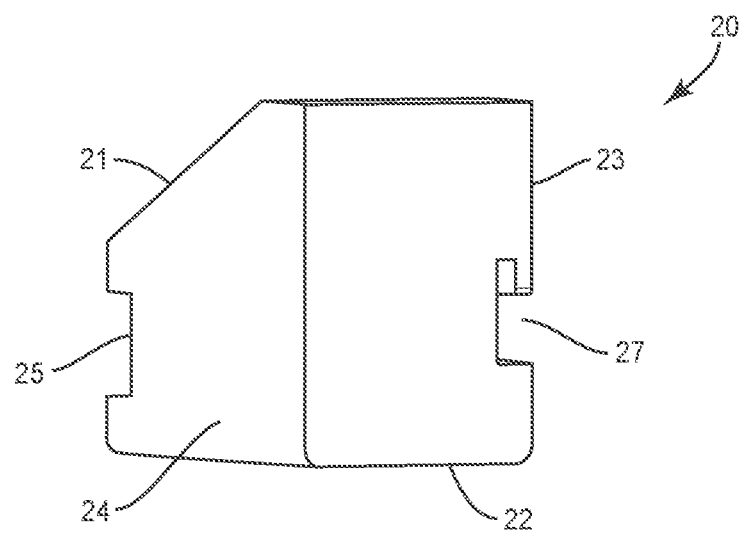
FIG. 4B is a rear perspective view of the first wedge of FIG. 4A.
Figure 5A:
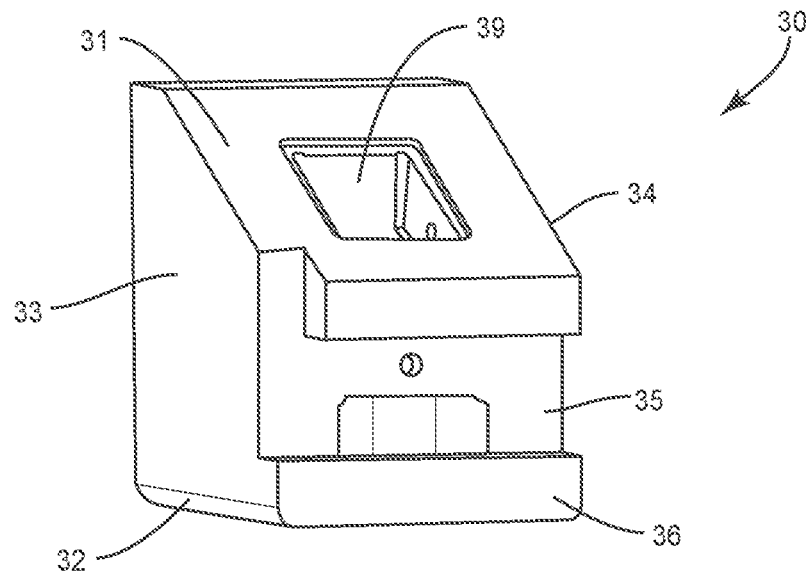
FIG. 5A is a front perspective view of a second wedge.
Figure 5B:
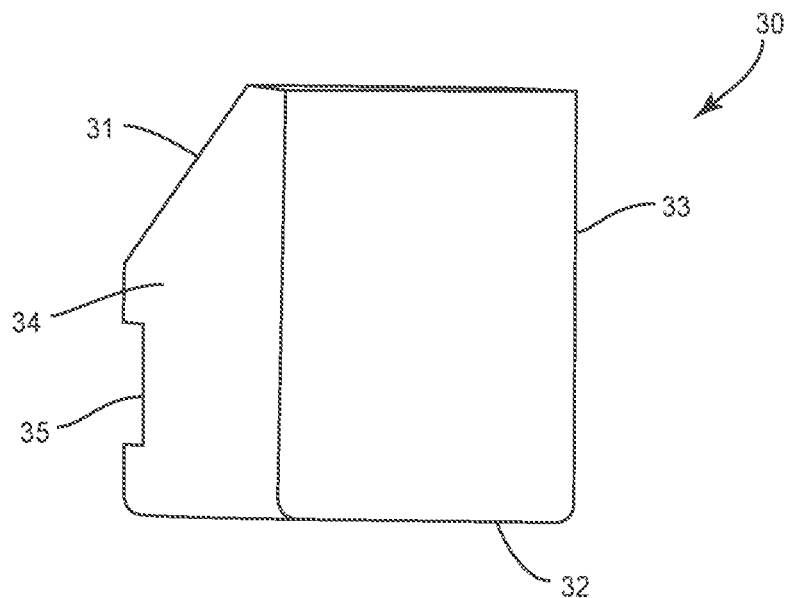
FIG. 5B is a rear perspective view of the second wedge of FIG. 5A.

FIGS. 4A and 4B illustrate the first wedge 20. The first wedge 20 includes a top side 21 and an opposing bottom side 22. During use, the bottom side 22 is positioned on the material 100 and the top side 21 faces outward. The first wedge 20 further includes an inner lateral side 23 that faces towards the second wedge 30, and an opposing outer lateral side 24. A front side 26 extends between the lateral sides 23, 24. The second wedge 30 is illustrated in FIGS. 5A and 5B. The second wedge 30 includes a top side 31, bottom side 32, inner lateral side 33, outer lateral side 34, and a front side 36.

The wedges 20, 30 can be constructed from a variety of different materials, including but not limited to metals and polymers. In one example, the wedges 20, 30 are solid. In another example, the wedges 20, 30 are hollow and filled with fluid. The top sides 21, 31 are positioned at acute angles relative to the respective bottom sides 22, 32 thus giving the first and second wedges 20, 30 their wedge shape.

Mounting positions 29, 39 are located respectively on the top sides 21, 31. The mounting positions 29, 39 are configured to receive and position the phased array probes 40, 50 at one or more angular positions. In one example, the mounting positions 29, 39 are receptacles that extend into the top sides 21, 31. In one example, the receptacles extend through an entirety of the wedges 20, 30. In another example, the receptacles extend into the top sides 21, 31 but terminate within the interior of the wedges 20, 30 away from the bottom sides 22, 32. The mounting positions 29, 39 can be located on other sides of the first and second wedges 20, 30, such as within the outer lateral sides 24, 34. In the examples illustrated, the mounting positions 29, 39 are located at the same position on each of the wedges 20, 30. The testing device 10 can also include the mounting positions 29, 39 being at different locations on the different wedges 20, 30

In one example, the bottom sides 22, 32 are substantially flat. This facilitates contact against and movement along the material 100. In another example, the bottom sides 22, 32 include one or more indents and/or extensions, but are configured to still provide for sliding movement along the material 100.

The first and second wedges 20, 30 are positioned adjacent to one another in the testing device 10. In one example, the inner lateral sides 23, 33 abut together and slide across each other during the relative parallel movement. In another example, the inner lateral sides 23, 33 are in proximity but are spaced apart by a gap.

The coupling structure 60 is configured to allow for the first and second wedges 20, 30 to move parallel to one another in the first direction. The coupling structure 60 prevents relative movement of the first and second wedges 20, 30 in other directions. In one example, the bottom sides 22, 32 of the first and second wedges 20, 30 remain aligned within a plane during the parallel movement.

The coupling structure 60 is configured to position the wedges 20, 30 with the inner lateral sides 23, 33 facing together and the bottom sides 22, 32 being aligned within a plane. In one example as illustrated in FIGS. 4A and 4B, the inner lateral side 23 of the first wedge 20 includes a slot 27 with a narrow opening that widens into an enlarged cavity. A slide 70 as illustrated in FIG. 6 is mounted to the inner lateral side 33 of the second wedge 30. The slide 70 includes a face 71 that abuts against the inner lateral side 33 and openings 72 configured to receive fasteners to attach the slide 70 to the second wedge 30. The slide 70 includes steps 73, 74 that correspond to the slot 27. The larger step 74 fits within the cavity and smaller step 73 aligns within the opening into the slot 27. The slide 70 is configured to fit within and move along the slot 27 to allow for the parallel movement. In one example as illustrated in FIG. 4A, the slot 27 extends the entirety of the inner lateral side 23 with each end of the slot 27 being open. This configuration provides for wedges 20, 30 to be initially offset and then for the slide 70 to be slid into the slot 27 from one of the ends during initial engagement. In one example, the slide 70 extends along the entire inner lateral side 33 of the second wedge 30. In another example, the slide 70 is shorter than the second wedge 30 and extends along a limited portion of the inner lateral side 33.

The slide 70 extends laterally outward beyond the inner lateral side 33 of the second wedge 30. In one example, the slide 70 is constructed from a different material than the second wedge 30. Fasteners, such as screws, bolts, rivets, etc. can extend through the openings 72 to secure the slide 70 to the second wedge 30. The slide 70 can also be constructed from a variety of materials including but not limited to metals and polymers. In one example, the slide 70 is constructed from a different material than either of the first or second wedges 20, 30.

The slide 70 is configured to fit within the slot 27 and allow for the parallel movement of the first and second wedges 20, 30. This configuration also prevents movement of the first and second wedges 20, 30 in other directions. Further, the inner lateral sides 23, 33 include complimentary shapes to provide for the parallel movement. In one example, each of the inner lateral sides 23, 33 is perpendicular to the respective bottom side 22, 32. In another example, one of the lateral sides 23, 33 is positioned at an acute angle relative to the respective bottom side 22, 32 and the other inner lateral side 23, 33 is positioned at an obtuse angle relative to its bottom side 22, 32.

The coupling structure 60 further sections 61, 62 that attach to the respective first and second wedges 20, 30. One example of a coupling structure 60 includes first and second sections 61, 62 as illustrated in FIGS. 7, 8, and 9. The first section 61 attaches to the first wedge 20 and the second section 62 attaches to the second wedge 30. The first section 61 includes an arm 63 configured to extend along the front side 26 of the first wedge 20 and an extension 65. In one example, the arm 63 is perpendicular to the extension 65. The second section 62 includes an arm 64 configured to extend along the front side 36 of the second wedge 30 and an extension 66. In one example, the arm 64 is perpendicular to the extension 66. In one example, the arm 63 of the first section 61 is positioned in a slot 25 (see FIG. 4A) in the front side 26 of the first wedge 20 and the outer surface of the arm 63 is flush with the front side 26. Likewise, the arm 64 of the second extension 66 is positioned in a slot 35 (see FIG. 5A) in the front side 36 of the second wedge 30 and outer surface of the arm 64 is flush with the front side 36. The flush mounting reduces the overall length L of the device 10 thus providing for the device 10 to be used in a wider variety of locations and applications.

The extensions 65, 66 intermesh together with an amount of overlap dependent upon the overall length L of the device 10. A scale 68 is positioned on one or both extensions 65, 66. The scale 68 is used to measure one or more distances, including a distance between the mounting positions 29, 39, an overall length L and/or a length of a weld thickness that connects together adjoining pieces of the material 100.

A locking member 67 secures the relative positions of the extensions 65, 66 to lock the relative positions of the wedges 20, 30. In one example, the locking member 67 is a screw that extends through the extensions 65, 66.

The extensions 65, 66 extend along one lateral side of the device 10. This provides for the scale 68 and locking member 67 to be viewable and/or accessible on one side of the device 10. This facilitates the use as a user is not required to reach across or otherwise access and/or visually see features on both lateral sides of the device 10.

Figure 10:
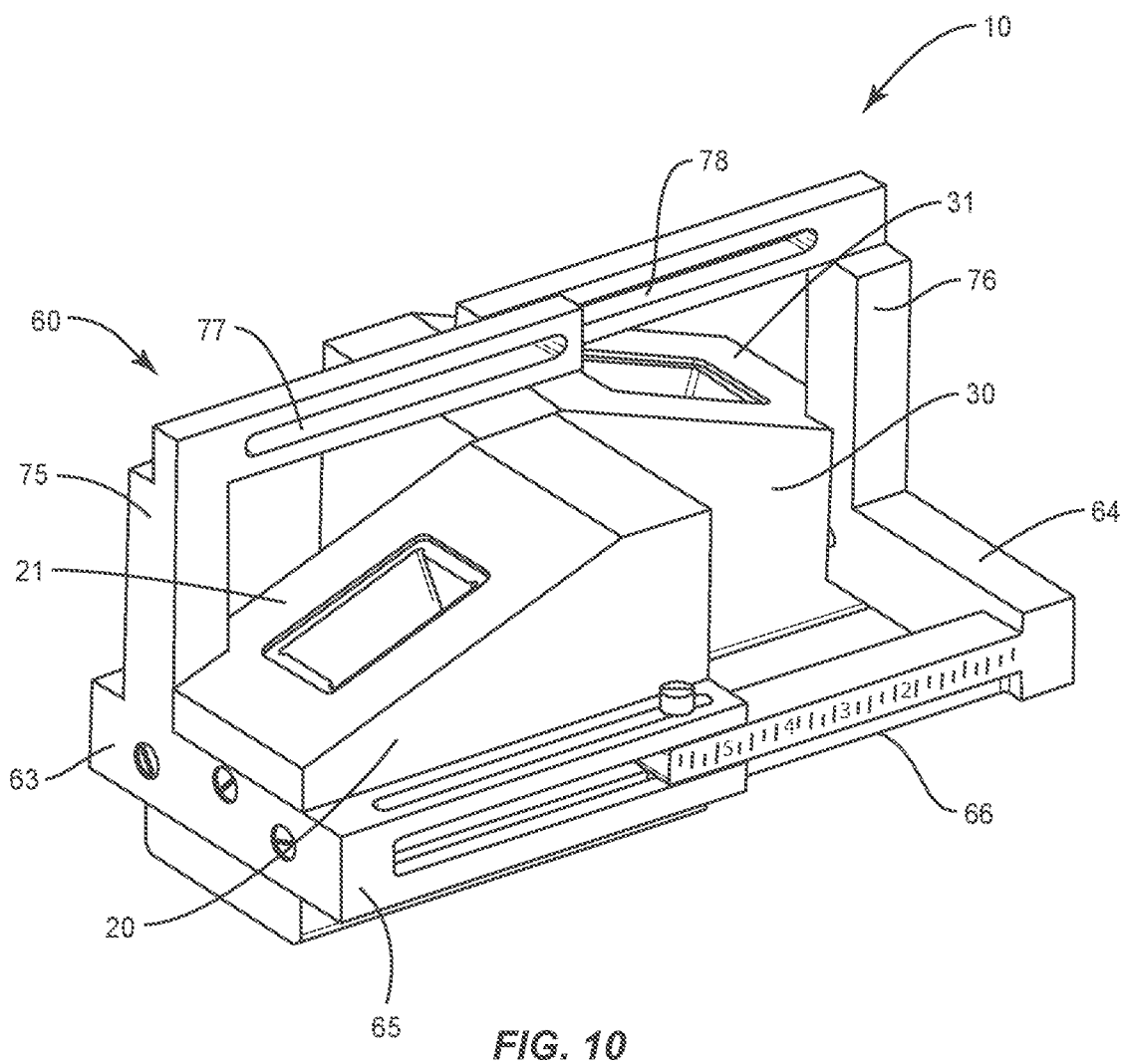
FIG. 10 is a perspective view of a testing device that includes first and second wedges and a coupling structure.

The coupling structure 60 can include various structures that connect the first and second wedges 20, 30. FIG. 10 includes a coupling structure 60 that extends over the top sides 21, 31 of the first and second wedges 20, 30. An arm 75 is connected to and extends upward from the arm 63. Likewise, an arm 76 is connected to and extends upward from the arm 64 at the second wedge 30. The arms 75, 76 each have an "L" shape and extend over the top sides 21, 31 of the respective first and second wedges 20, 30. The arms 75, 76 are laterally aligned with the ends of the arms 75, 76 overlapping in a side-by-side arrangement. The arms 75, 76 include slots 77, 78 that can align to receive a fastener (not illustrated) to connect the arms 75, 76 together. The arms 75, 76 are connected together but allow for relative movement of the wedges 20, 30 in the parallel direction to adjust the length L of the device 10. The arms 75, 76 can also provide for a means to attach the testing device 10 to a robotic device 200 for movement along the material 100.

Figure 11:
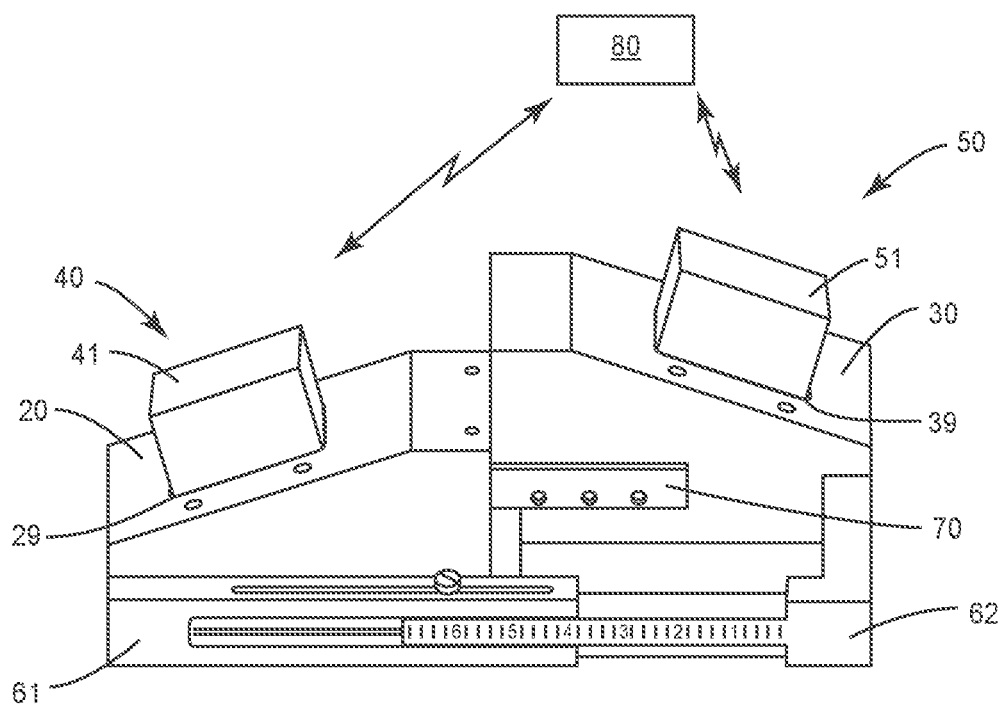
FIG. 11 is a perspective view of phased array probes mounted within a testing device and in communication with a control unit.

The first and second wedges 20, 30 are configured to receive and position the first and second phased array probes 40, 50. FIG. 11 illustrates an example of first and second phased array probes 40, 50 mounted respectively in the first and second wedges 20, 30. Each of the phased array probes 40, 50 includes a housing 41, 51 that extends around and protects electrical components. The housings 41, 51 are configured to be mounted at the mounting positions 29, 39. The mounting positions 29, 39 are configured to align the first and second phased array probes 40, 50 at a desired angular orientation relative to the first and second wedges 20, 30 and the material 100. The mounting positions 29, 39 can include different configurations to provide for multiple angular settings. In one example, the mounting positions include a stepped configuration that supports the respective housings 41, 51 at different angular positions. In another example, the first and second phased array probes 40, 50 are configured to be adjustable to accommodate different angular positions.

The first and second phased array probes 40, 50 each include a transducer that includes a beamforming oscillator that produces an electronic signal. The signal is applied to an array of transducer elements that are each pulsed independently. In one example, the transducer elements are aligned in a plane along an edge of the housing 41, 51. The array of transducer elements transmits the signals at varying timing. The oscillator controls the timing of the emissions of the electric signals from each of the transducer elements to create the pulses. In another example, timing units receive the signal from the oscillator and control the timing through the transducer elements. The number of transducer elements can vary from a single transducer element to two or more transducer elements. In one example, the transducer elements function as transceivers to both transmit and receive the signals. In another example, the transducer includes transducer elements that transmit the signals and separate receiver elements that receive the return signals.

A control unit 80 controls the operation of the first and second phased array probes 40, 50. In one example as schematically illustrated in FIG. 11, the control unit 80 is separate from the first and second phased array probes 40, 50. This can include the control unit 80 located remotely away from the testing device 10, or located at one of the wedges 20, 30 and/or coupling structure 60. The first and second phased array probes 40, 50 can communicate with the control unit 80 in various manners including wireless communications and hardwire connection. In one example, the control unit 80 is located in one of the phased array probes 40, 50.

Figure 12:
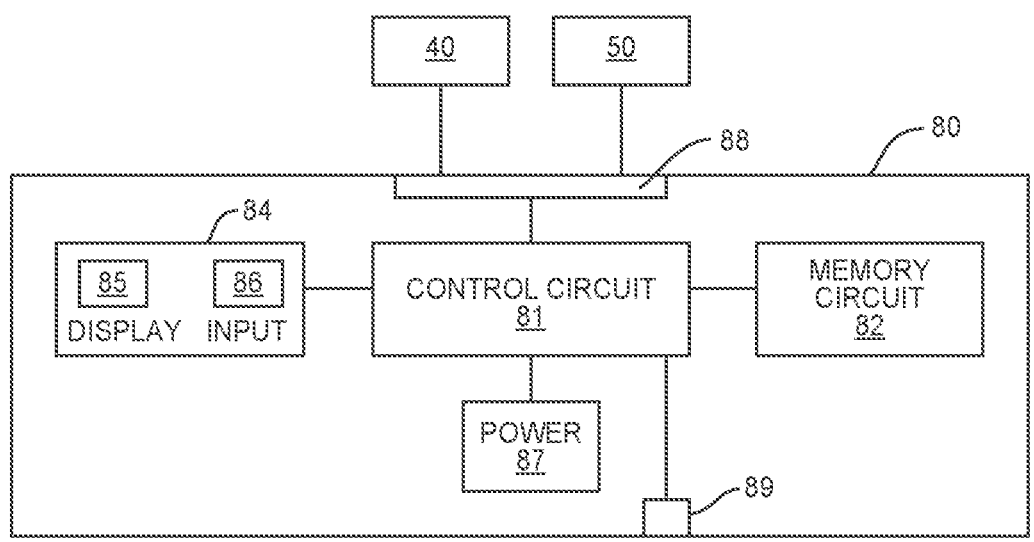
FIG. 12 is a schematic diagram of a control unit.

FIG. 12 illustrates a control unit 80 configured to communicate with first and second phased array probes 40, 50. An interface 88 provide for communicatively connecting with the phased array probes 40, 50. The control unit 80 includes a control circuit 81 and a memory circuit 82. The control circuit 81 controls the operation of the first and second phased array probes 40, 50 according to program instructions stored in the memory circuit 82. Within examples, the control circuit 81 includes one or more circuits, microcontrollers, microprocessors, hardware, or a combination thereof. Memory circuit 82 includes a non-transitory computer readable storage medium storing program instructions, such as a computer program product, that configures the control circuit 81 to implement one or more of the techniques discussed herein. Memory circuit 82 can include various memory devices such as, for example, read-only memory, and flash memory. In one example, memory circuit 82 is a separate component as illustrated in FIG. 12. In another example, memory circuit 82 is incorporated with the control circuit 81.

A user interface 84 provides for a user to control one or more aspects of the first and second phased array probes 40, 50. This can include one or more displays 85 for displaying information to the user. The user interface 84 can also include one or more input devices 86 such as but not limited to a keypad, touchpad, roller ball, and joystick. The one or more input devices 86 provide for the user to enter commands to the control circuit 81. In different examples, the one or more displays 85 and input devices 86 are positioned on one or both of the first and second phased array probes 40, 50.

A power source 87 provides power to the control unit 80, and can also provide power to the one or both of the phased array probes 40, 50. The power source 87 can include various configurations, including but not limited to batteries. The power source 87 can also be configured to connect with and receive power from an external source.

In one example, the control unit 80 receives data indicative of the reflected signals from the first and second phased array probes 40, 50 and performs the calculations to determine or identify one or more aspects of the material 100. The control unit 80 can also be configured to output results to the display 85 and/or a remote device. In another example, the control unit outputs the data to a remote computing device that analyzes the data. In one example, the control unit 80 is configured to wirelessly transmit the signals to the remote computing device. In another example, the control unit 80 includes an output interface 89 to provide for a hardwire connection to transmit the signals.

During testing, the testing device 10 is moved along the surface of the material 100. The process is performed manually by one or more users that are conducting the testing. This process can include adjusting the coupling structure 60 to position the first and second wedges 20, 30 and attached phased array probes 40, 50 at the desired relative positions. The coupling structure 60 is then locked to prevent additional movement. The testing device 10 is then moved along the surface of the material by the one or more users to perform the testing.

Figure 13:
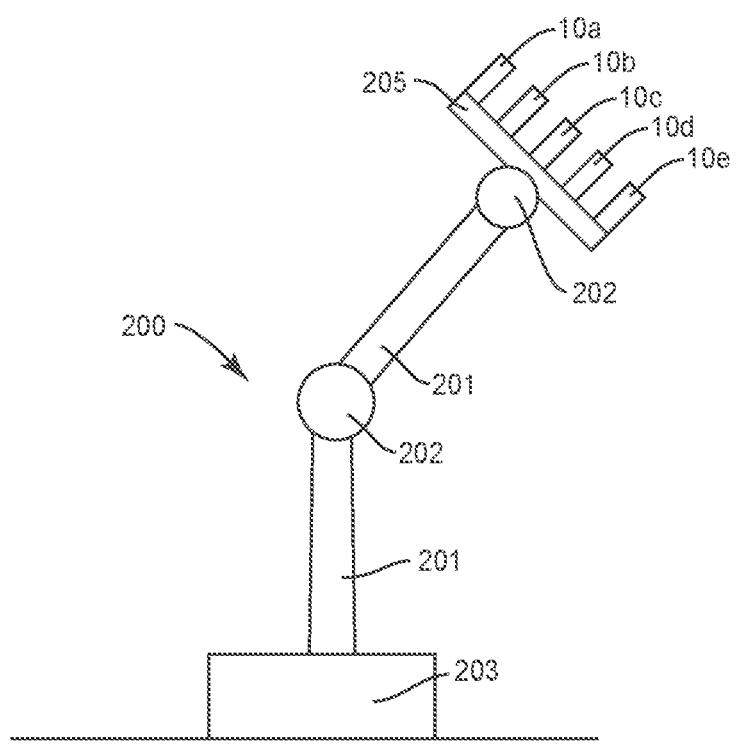
FIG. 13 is a schematic diagram of a robotic device attached to multiple testing devices.

In another example, the testing device 10 is configured to be attached and controlled through a robotic device 200. The testing device 10 can be used with a wide variety of robotic devices 200 that provide for attachment, positioning, and/or movement. FIG. 13 illustrates one example of a robotic device 200 configured to operate and move the testing device 10. The robotic device 200 includes one or more arms 201 that are movably connected together at joints 202. A base 203 that can be fixed to a support floor, or can be movable about the support floor. A tooling fixture 205 is configured to mount two or more testing devices 10 to the robotic device 200.

Figure 14:
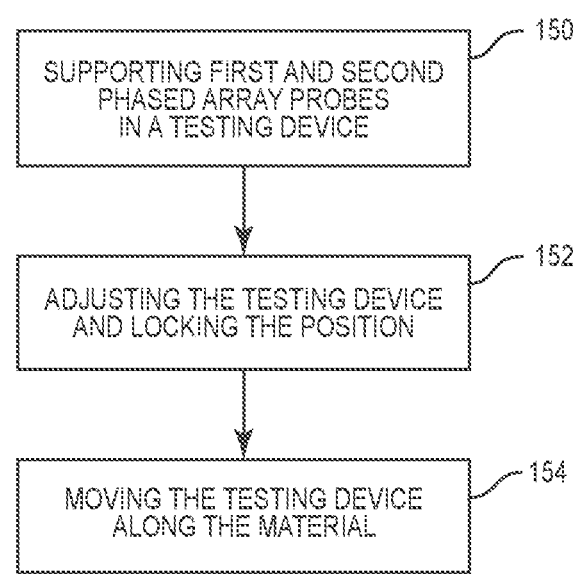
FIG. 14 is a flowchart diagram of a method of non-destructive testing a material.

FIG. 14 illustrates a method of non-destructive ultrasonically testing a material 100 using first and second phased array probes 40, 50. The first and second phased array probes 40, 50 are supported in a testing device 10 (block 150). The testing device 10 includes first and second wedges 20, 30 configured to respectively maintain the phased array probes 40, 50 in corresponding orientations relative to a surface of the material 100.

The method includes adjusting the testing device 10 and locking a coupling structure 60 when the first and second wedges 20, 30 are in a selected configuration relative to each other (block 152). The coupling structure 60 allows for selective relative movement between the first and second wedges 20, 30 in a first direction while restricting relative movement in other directions. Once the coupling structure 60 is locked, the method includes moving the testing device 10 along the surface of the material 100 (block 154).

While the testing device 10 is moved along the surface of the material 100, the phased array probes 40, 50 emit signals towards the material 100. In one example, signals that encounter a target in the material are reflected back towards and received by the testing device 10. Signals that do not encounter a target are not reflected back and thus are not received by the testing device 10. Based on the received signals and the lack of received signals, the control unit 80 is able to analyze the material 100 and any targets which can include but are not limited to voids, delaminations, and foreign material.

In one example with the robotic device 200 is configured to support multiple testing devices 10 with the different phased array probes 40, 50 of the various testing devices 10 positioned at different angular orientations that have different angular positions, beam angles, and/or focal distances. This provides for the material 100 to be tested in a single pass (or reduced number of passes) of the robotic device 200 while maintaining coverage and sensitivity.

In one example, the first and second wedges 20, 30 of the testing device 10 are positioned at the desired configuration and locked. The testing device 10 is then moved along the material 100 to perform the testing. Once complete, the coupling structure 60 is unlocked, and the first and second wedges 20, 30 and/or probes 40, 50 are adjusted to a different configuration. Once positioned, the coupling structure 60 is again locked and the testing device 10 is again passed over the material 100 for additional testing.

The examples described above include a single phased array probe 40, 50 attached to each wedge 20, 30. In other examples, two or more phased array probes 40, 50 are attached to one or both of the wedges 20, 30.

In one example, the phased array probes 40, 50 include multiple transducer elements. The transducer elements can be arranged in a curvilinear arrangement or a linear arrangement. In another example, one or both probes 40, 50 includes a single transducer element. In the various examples, the mounting positions 29, 39 within the respective first and second wedges 20, 30 are configured to position the probes 40, 50 at the desired angular orientation and distance from the bottom sides 22, 32.

The testing device 10 and methods are used for testing a wide variety of different applications. In one example, the testing device 10 and methods are used to detect friction stir welds. One specific example includes testing a friction welded joint of a cryogenic tank. The testing device 10 can be used for testing materials 100 in a wide variety of applications. In one example, the testing device 10 can be advantageously used to test material 100 used during the manufacturing of relatively large devices. Examples include but are not limited to materials used within structures in commercial aircraft, spacecraft, rotorcraft, satellites, rockets, missiles, and various water borne vehicles.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A phased array ultrasonic testing device for positioning first and second phased array probes relative to a surface of a material to be tested, the testing device comprising:
    a first wedge configured to receive and orient the first phased array probe relative to the surface;
    a second wedge configured to receive and orient the second phased array probe relative to the surface;
    a coupling structure mounted to the first and second wedges and configured to selectively provide for the first and second wedges to move parallel to one another in a first direction and restrict relative movement of the first and second wedges in other directions;
    a scale positioned on at least one of the first wedge and the second wedge, the scale configured to measure a distance between the first phased array probe and the second phased array probe; and
    a locking member that locks the scale to prevent relative movement between the first wedge and the second wedge.

2. The testing device of claim 1, wherein the coupling structure maintains bottom sides of the first and second wedges aligned within a plane during the parallel movement.

3. The testing device of claim 1, wherein the coupling structure comprises a first section mounted to the first wedge and a second section mounted to the second wedge with each of the first and second sections comprising extensions that mate together in an overlapping arrangement.

4. The testing device of claim 3, wherein the coupling structure extends along a lateral side of just one of the first and second wedges and is positioned away from the lateral side of the other one of the first and second wedges.

5. The testing device of claim 3, wherein the first section is mounted in a slot in a front side of the first wedge and is flush with the front side and the second section is mounted in a slot in a front side of the second wedge and is flush with the front side.

6. The testing device of claim 1, wherein the first and second wedges comprise inner lateral sides and the coupling structure is configured to maintain the inner lateral sides abutted together.

7. The testing device of claim 6, further comprising a slot in the inner lateral side of the first wedge and the coupling structure further comprises a slide that extends laterally outward beyond the inner lateral side of the second wedge with the slide positioned in the slot.

8. The testing device of claim 7, wherein the slide is constructed from a different material than the first and second wedges and is attached to the inner lateral side of the second wedge.

9. A phased array ultrasonic testing device for positioning first and second phased array probes to test a material, the testing device comprising:
a first wedge comprising a bottom side, a top side, inner and outer lateral sides, and a mounting position configured to receive the first phased array probe with the top side positioned at a first acute angle relative to the bottom side;
a second wedge comprising a bottom side, a top side, inner and outer lateral sides, and a mounting position configured to receive the second phased array probe with the top side positioned at a second acute angle relative to the bottom side;
a coupling structure that aligns the first and second wedges together with the inner lateral sides positioned together, the bottom sides aligned in a plane, and the top sides angled outward away from each other, the coupling structure configured to provide for relative parallel movement between the first and second wedges with the bottom sides remaining aligned within the plane and the top sides at a fixed angular position relative to each other; and
a scale attached to the first wedge and the second wedge to measure a distance between the mounting positions of the first and second wedges, the scale positioned away from the top sides of the first and second wedges to be accessible on one of the lateral sides of the first and second wedges.

10. The testing device of claim 9, wherein the coupling structure comprises:
a first section mounted to the first wedge; and
a second section mounted to the second wedge;
the first and second sections engaged in intermeshing arrangement to be movable relative to each other to provide for the relative parallel movement between the first and second wedges with the bottom sides remaining aligned within the plane.

11. The testing device of claim 10, wherein the coupling structure further comprises a single locking member attached to the scale, the locking member movable between a locked position to prevent relative movement between the first and second sections and an unlocked position to allow relative movement between the first and second sections.

12. The testing device of claim 10, wherein the first section is embedded within a front side of the first wedge and the second section is embedded within a front side of the second wedge.

13. The testing device of claim 10, wherein the coupling structure further comprises arms that extend over top sides of the first and second wedges.

14. The testing device of claim 9, further comprising a slot in the inner lateral side of the first wedge and a slide that extends outward from the inner lateral side of the second wedge with the slide positioned in the slot.

15. A method of non-destructive testing a material using first and second phased array probes, the method comprising:
supporting the first and second phased array probes in a testing device having first and second wedges configured to respectively maintain the first and second phased array probes in corresponding orientations relative to a surface of the material upon which the testing device is placed;
coupling together the first and second wedges to selectively allow relative movement thereof in first and second directions in a first plane while restricting relative movement in other directions outside of the first plane;
moving the first and second wedges relative to each other in the first and second directions and adjusting a distance between the first and second phased array probes;
measuring the distance between the first and second phased array probes while moving the first and second wedges;
locking the first and second wedges together at a selected distance and preventing relative movement between the first and second wedges; and
moving the testing device along the surface with the first and second wedges locked together.

16. The method of claim 15, further comprising adjusting the coupling structure and moving the first and second wedges to the selected configuration.

17. The method of claim 16, further comprising intermeshing a first arm attached to the first wedge and a second arm attached to the second wedge while adjusting the coupling structure and overlapping the first and second arms.

18. The method of claim 17, further comprising securing a locking member that is attached to the first and second arms and preventing relative movement between the first and second wedges.

19. The method of claim 15, further comprising scanning the material with the first and second phased array probes while the testing device is in the selected configuration.

20. The testing device of claim 1, wherein the scale comprises a first extension mounted to the first wedge and a second extension mounted to the second wedge, the first extension and the second extension are intermeshed together with an amount of overlap dependent upon the distance between the first phased array probe and the second phased array probe.

* * * * *